F. DITCHFIELD.
DUMP CAR.
APPLICATION FILED SEPT. 20, 1915.
1,189,352.
Patented July 4, 1916.
2 SHEETS—SHEET 1.
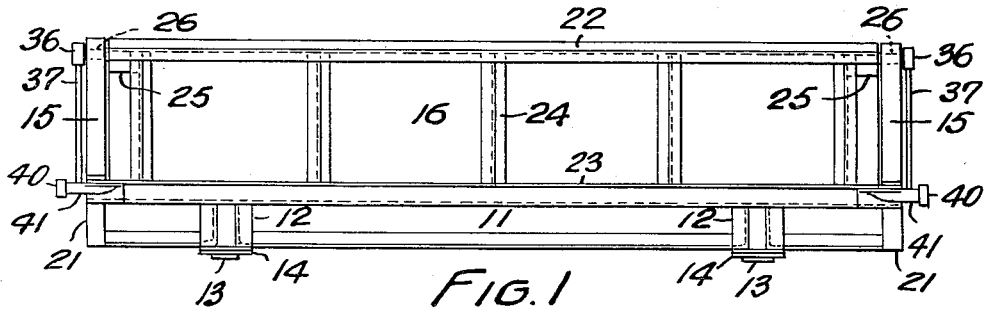
FIG. 1.
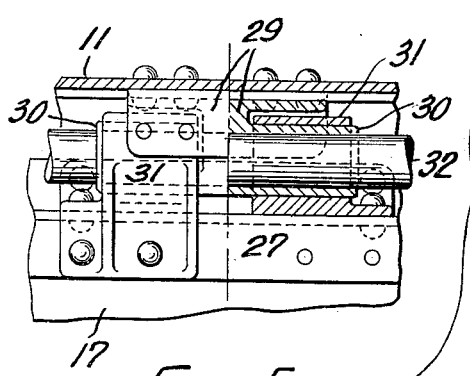
FIG. 5.
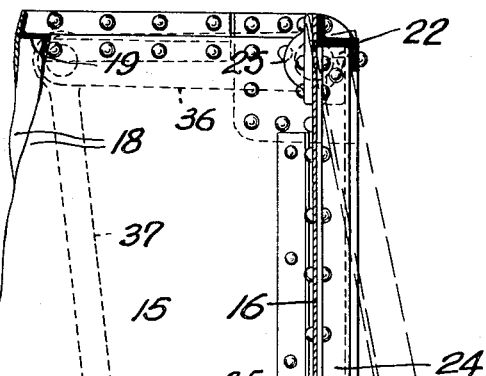
FIG. 4.
FIG. 6.
Witnesses
S. R. W. Allen
G. M. Moreland
Inventor
F. Ditchfield
By Fetherstonhaugh & Co
Attorneys

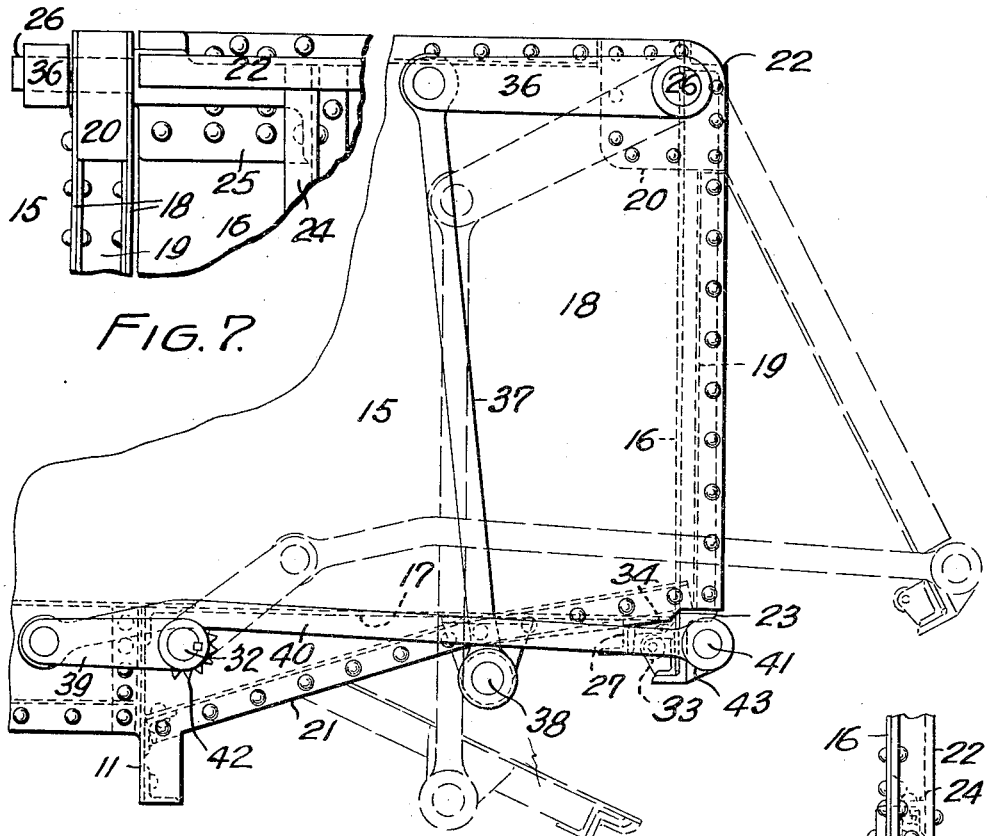
FIG. 7.
FIG. 2.
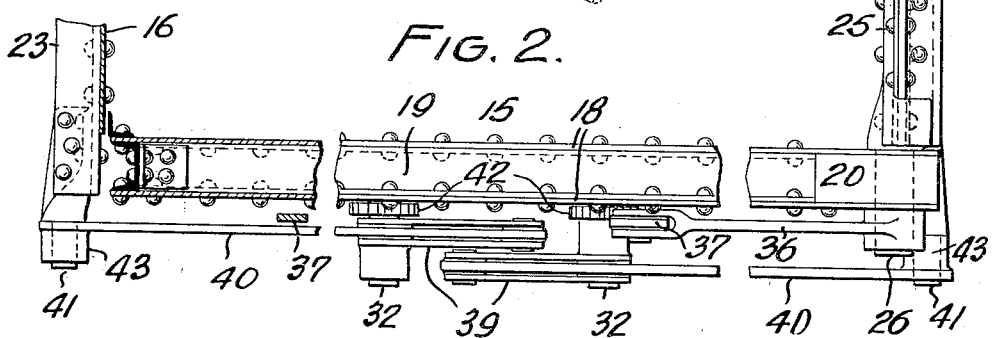
FIG. 3.

UNITED STATES PATENT OFFICE.

FRANK DITCHFIELD, OF MONTREAL, QUEBEC, CANADA.

DUMP-CAR.

1,189,352.   Specification of Letters Patent.   Patented July 4, 1916.

Application filed September 20, 1915. Serial No. 51,633.

*To all whom it may concern:*

Be it known that I, FRANK DITCHFIELD, a citizen of the Dominion of Canada, and resident of the city of Montreal, in the Province of Quebec and Dominion of Canada, have invented certain new and useful Improvements in Dump-Cars, of which the following is a full, clear, and exact description.

This invention relates to improvements in dump cars, and the object of the invention is to provide a car in which the load will discharge a sufficient distance to the sides to prevent flooding the rails.

A further object is to provide a car in which the doors will be substantially self closing.

Another object is to provide a car in which the discharge opening will extend without interruption from end to end of the car.

Dump cars of various types have been produced, but those of the side discharging type have for the most part been constructed with either the bottom or side fixed. There is not in use a car in which both the side and bottom move outwardly and form a chute for the escape of the load. The result of having a fixed side and drop bottom is that while the lower part of the load discharges laterally, the upper part is compelled by the fixed side to discharge downwardly, and mingles with the lower part of the load, checking the velocity thereof and changing the direction, so that the whole load discharges very close to the car, and a considerable portion floods the rail. A further disadvantage of dump cars is that considerable force is required to close the floor doors thereof, while the side doors slam shut with considerable violence on the escape of the load, and injure the car to a greater or lesser extent. Another disadvantage is that the side and bottom openings are obstructed to a greater or lesser extent by the frame members of the car. These disadvantages are overcome in the present car by providing a structure in which the entire side swings outwardly from the top and the entire longitudinal half of the bottom swings downwardly from the center, each in one piece. The sides and bottom doors are interengaging when closed so that no side sills and no transverse or vertical supports are employed, which would obstruct the opening. The entire weight of the car body rests on the center sill. The body ends are of very heavy construction and support the sides, which in turn support the outer edges of the bottom. In order to overcome the difficulty of closing the bottom doors, a connection is established between the sides and bottom, so that the action of gravity closing the sides is utilized to overcome the action of gravity holding the bottom doors open. An operating shaft is provided for each side of the car which is connected to the lower edge of the side door, so that complete raising of the bottom doors is effected through the medium of the side doors and the locking provided for.

In the drawings which illustrate the invention:—Figure 1 is a side elevation of the car. Fig. 2 is a partial end elevation. Fig. 3 is a fragmentary plan view at the end of the car. Fig. 4 is a partial cross section. Fig. 5 shows on the left a bottom plan view of the shaft bracket and floor door hinge, and on the right a horizontal section of the same on the line of the shaft axis. Fig. 6 is a fragmentary longitudinal section at the end of a floor door showing the connection of the operating gear. Fig. 7 is a fragmentary side elevation showing the side door trunnion.

Referring more particularly to the drawings, 11 designates the center sill to which are connected bolsters 12, carrying the usual center and side bearings 13 and 14 respectively. The body ends 15 are rigidly secured to the ends of the center sill, and are of extremely heavy construction, as they are required to support the entire weight of the side doors 16 and a portion of the weight of the floor doors 17, together with the load on the same. Preferably, the ends are formed of a pair of heavy plates 18 spaced apart and connected together at the edges by channels or members of other suitable suction, designated 19. At each upper corner, a heavy casting 20 is riveted between the plates and forms a bearing for the side door trunnions. The plates 18 of the ends extend below the floor line, as shown at 21, and are rigidly connected to the center sill throughout its entire depth.

The sides 16 are formed of unusually heavy plates stiffened at the upper edge by an external Z bar 22 arranged with its web horizontal, and at the lower edge by a Z bar 23 arranged with its web vertical and secured to the plate. These particular sections are specified, since they resist thrust in both vertical and horizontal directions, and are particularly convenient for the purpose. The sides are stiffened by vertically disposed members 24 riveted thereto. Heavy castings 25 are secured to the upper corners of the sides and terminate in trunnions 26 mounted in the bearings 20 of the ends. These castings 25 are riveted to the side plates, the longitudinal stiffener 22, and to the end vertical stiffeners 24, so that stresses are distributed as much as possible. It will thus be seen that the sides 16, which are in one piece from end to end of the car, are supported entirely from the ends, and are free to swing outwardly. This particular arrangement has the advantage of doing away with a fixed side frame from which the doors might be hung and offers a considerable economy in manufacture. A side frame to support the doors would require a considerable depth and weight of material if unsupported between the ends, and if supported between the ends by columns, the result of an unobstructed opening from end to end of the car is immediately lost. The sides are in themselves substantially plate girders, and by the addition of a comparatively small amount of material become not only self-sustaining, but able to sustain the weight of the floor.

The floor doors 17 each extend from end to end of the car and are hinged to the center sill. The plates forming the doors are suitably strengthened by longitudinal and transverse stiffening members 27 and 28 respectively, the longitudinal members 27 being preferably of Z section arranged with their webs perpendicular to the door plates and their free flanges adjacent, and thus forming convenient steps for the ends of the transverse stiffeners 28 so that stresses are distributed as uniformly as possible.

The hinging of these doors is one of the peculiarities of the structure. A pin casting 29 is secured to the center sill and is provided with a hollow pin 30. Socket castings 31 surrounding the pin are secured to the longitudinal stiffener of the door. The operating shaft 32 passes through and bears in the hollow pins 30. It will thus be seen that a considerable ecomomy of space has been effected, and the shaft also located in a convenient, out-of-the-way, and most effective position. The shaft axis is coincident with the center of oscillation of the door, but is also relieved of all load which would interfere with the easy operation thereof. The hollow pins which form the bearings of both the shafts and doors relieve the shaft of the weight of the doors, and are at the same time supported and held against breakage by the shaft.

The inwardly projecting lower flanges of each side door stiffener 23 are provided at suitable intervals with rollers 33 adapted to travel on suitable track members 34 secured to the lower surfaces of the floor doors 17 at the free edges thereof. If desired, the ends 15 may be provided with small angles or the like 35 secured thereto in position to form jamb plates for the side and floor doors.

A lever 36 is secured at one end to the portion of each trunnion 26 projecting through the bearing 20. A link 37 is pivotally connected to the free ends of this lever, and extends downwardly to a pin 38 mounted on the floor door, and projecting beyond the car end 15. The length of lever 36 and the position of the pin 38 are dependent upon the weight and dimensions of the side and floor doors, and therefore no definite positioning of the same can be defined, further than by stating that the arrangement must be such that the side door in closing by the action of gravity must be able to raise the floor door to approximately closed position. It cannot be expected that the side door will completely close the floor door, since as the side door approaches a vertical position, its effectiveness decreases, while as the floor door is being raised, its resistance increases. However, by judicious arrangement of weights and leverages, the floor door may be raised within approximately 5° of complete closure, where its weight will counterbalance the effective weight of the side door. In order to complete the closing and to lock the doors in closed position, a lever or crank 39 is fixed to the end of the operating shaft, and is connected by an offset link 40 with a pin 41 secured to the lower edge of the side door on the outer surface thereof. In order to complete the closure, the shaft is rotated, and by means of the crank 39 and link 40 draws the lower edge of the side door toward the center line of the car, and raises the floor door to proper position through the medium of the side door, the lever 36 and link 37. When the paths of the doors intersect, the contacting points will be the rollers 33 of the side doors and the tracks 34 of the floor doors, so that friction will be reduced to a minimum. The members 39 and 40 with the shaft 32 form the locking mechanism of the doors, and for this purpose the offset of the link 40 must be such that the center of connection between the crank 39 and link 40 will be on the opposite side of a produced line drawn through the centers of the pin 41 and the shaft 32 from the body of the link, so that tension of the link caused by side thrust of the load against the side door will tend to cause a continuance of shaft revolution in the closing direction, which revolution is checked by the link bearing against the shaft. In order to hold the shaft against revolution by vibration and to rotate the same in either opening or closing direction, any suitable and well known locking and operating gear may be used, of which only the ratchet wheel 42 is shown. It must be borne in mind that this car is not provided with end sills, the body ends serving this purpose, so that there are no projections at the end of the car to interfere with the operation of the links and levers just described. A convenient method of arranging these is shown in Fig. 3. The pins 41 on each side door are identical, and also the pins 38 of the floor doors, although projecting a shorter distance beyond the body end. Cranks 39 are formed with two webs separated slightly more than the thickness of the links 40 and formed either integral or separate as desired. The links are pivoted between the webs of the cranks and at the opposite end are provided with bosses 43, which engage the pins 41. As the cranks are generally of such length that they will overlap at the center of the car, it is necessary to position one outside the other, and in order to economize space and utilize similar pins 41 on the doors, the boss of the link on the inner crank is outwardly turned and the boss of the link on the outer crank is inwardly turned, as will be clearly seen in Fig. 3. The shaft operating and locking gear is preferably located between the cranks and the car end, and thus spaces the links 40 sufficiently away from the end for the passage of the links 37.

The operation of the car is extremely simple and easy. Assuming the body in closed position, as shown in full lines, Figs. 2 and 4, and a load within the body, all that is necessary to discharge the load is to operate the shaft rotating gear, to turn the shaft through a few degrees to shift the pivotal connection of the crank and link 40 across the produced line through the centers of the pin 41 and shaft, thus unlocking the doors. The side thrust of the load forces the side door outwardly to the limit permitted, the link and crank operating idly and exercising no retarding influence on the door, unless such has been desired and the shaft operating gear set to limit the speed of revolution. When the side door moves outwardly a sufficient distance, it releases the edge of the floor door, which then drops by its own weight and by the downward pressure of the load. Should the side thrust of the load be insufficient to open the side door, the tension of the link 37 exercised by the dropping of the floor door will act through the lever 36 to open the side door, so that the doors assume the position shown in broken lines, Fig. 2. It will be seen that the doors in this position form a laterally directed chute which will discharge the contents of the car freely and quickly to the side. The outward swing of the side door enables the entire depth of the load to shift laterally and discharge in a lateral direction, thus overcoming the downward discharge of the upper part of the load incident to a fixed side, which deflects the laterally discharging lower portion of the load and results in flooding of the rails. It is obvious that if the load is of a nature which does not flow readily, that is which has very small lateral pressure, such as cinders, earth fill which has settled by long standing in the car, or other material, the side door may not readily move a sufficient distance to release the floor door. This is, however, easily accomplished by slight additional rotation of the shaft which will force the side door out sufficiently to disengage the floor door.

When the load has been fully discharged, the side door drops by gravity and by means of the lever 36 and link 37 raises the floor door, and by means of the link 40 and crank 39 rotates the shaft 32 in the closing direction. It will be readily understood that since the side and floor doors are pivoted at one edge, at least half the weight of each door is sustained by the rigid portions of the car. As however, during the closing movement, the side door is dropping more and more into line with its support, it will be clearly understood that the effective weight, or in other words, the utilizable pull of the force of gravity, is gradually decreasing as the door closes, while the reverse applies to the floor door. It is obvious, therefore, that even though the side door is much heavier, an equilibrium will be reached before the doors are in their fully closed position. This occurs when the doors are approximately in the position shown in broken lines, Fig. 4, although the angles of opening at which the doors will come to rest depends entirely upon their relative weights and the location and size of the connections. Of course in actual practice, the velocity of the doors in closing will carry them some distance past the point of equilibrium, possibly even to the point of complete closure; and when this proves the case, judicious application of the usual pawl to the ratchet wheel 42 will hold the doors closed. If, however, the doors come to rest in the position shown in Fig. 4, a partial revolution of the shaft 32 by means of the usual mechanism will draw the side door to vertical position, and through the medium of the lever 36 and link 37 raise the floor door. This operation will not be at all difficult. The maximum weight required to be moved is half the weight of the floor door, which at the commencement of the operation is exactly counterbalanced by the side door. In addition, a leverage is obtained over the floor door equal to the length from the center of the trunnion 26 to the center of the pin 41, less the length of the arm 36 and the crank 39. When the doors are once in motion and before the difference between the effective weights of the side and floor doors is felt, the roller 33 of the side door will engage under the track 34 of the floor door, so that the entire effective weight of the floor door will be supported by the side door, and the effort required to raise the floor door the short remaining distance will be negligible, owing to the slightly tapered form of the track which resolves further movement into a wedging action, which may obviously be accomplished with great ease. When the doors are in fully closed position, the shaft is rotated until movement is checked by the link 40 engaging the shaft, at which point the mechanism will be locked of itself and the shaft operating mechanism relieved of all stress arising from transmitted side thrust of a load which may be placed in a car.

It will be understood that both sides of the car are the same, and that both ends are alike, so that the transmission of force between the side and floor doors is uniform and twisting of the doors is eliminated. It will be clearly understood that with the unobstructed opening extending the whole length of the car, the contents may be very quickly discharged, and that owing to the arrangement of the doors, the contents will discharge clear of the track, so that no shoveling is required before the car can be moved. Combined with this, the practically automatic closing of the doors enables the car to be brought to position, dumped, and moved away in an unusually short space of time, which is one of the most important features to be considered in connection with cars of this character.

A number of minor changes in the structure of the car may be necessitated for different classes of load. For instance, ore and cinder cars, which require an excessive slope to discharge properly, may be constructed with a deeper center sill, with the result that the inner edges of the floor doors will be raised, thus permitting a very sharp inclination when the doors are open.

Having thus described my invention, what I claim is:—

1. In a car, a center sill, body sides pivotally supported, and a floor supported partly by the center sill and partly by the sides.

2. In a car, a framework, a door, an operating shaft, and hinges supporting the door on the framework and forming bearings for the operating shaft.

3. In a car, a center sill, body ends rigidly connected to the center sill, body sides pivotally supported by the ends, and a floor supported partly by the center sill and partly by the sides.

4. In a car, a center sill, body ends rigidly connected thereto, and doors continuous from end to end of the car forming body sides pivotally connected at their upper corners to the ends and floor doors continuous from end to end of the car, each pivotally connected at one edge on the center sill.

5. In a car, a center sill, a pair of plate girders forming body sides, floor doors pivotally connected at their inner edges to the center sill and supported at their outer edges by the sides, and body ends of box girder form rigidly connected to the center sill and pivotally supporting the sides from the upper corners thereof.

6. In a car, a center sill, body ends rigidly connected to the center sill, body sides pivotally supported at their upper corners from the ends and extending in one piece from end to end of the car, and floor doors pivotally supported at their inner edges from the center sill and releasably supported at their outer edges from the sides, said doors extending from end to end of the car.

7. In a car, a body side of plate girder form adapted when supported only at the upper corners to be rigid in the support of its own weight and a part of the weight of the floor, together with a proportion of the load in the car thrusting downwardly and laterally.

8. In a car, a body side in one piece comprising a web plate, upper and lower chords secured thereto, said lower chord forming an inturned flange adapted to support a floor door, and web stiffeners arranged perpendicularly between the upper and lower chords.

9. In a car, a center sill, body ends rigidly connected thereto, body sides which extend in one piece from end to end of the car and pivotally supported at the ends from their upper corners, a tension member of Z section having its web connected to the lower edge of the side and its lower flange projecting inwardly, and a floor door supported partly by the center sill and partly by the flange of said tension member.

10. In a car, a side door pivotally suspended at its upper corners and a floor door pivotally suspended at its inner edge and adapted to engage with the side door at its outer edge for support in closed position, and connection between said doors whereby the side door falling to closed position will raise the floor door to closed position and engagement with the side door.

11. In a car, a pivotally suspended side door and a pivotally suspended floor door, an operating shaft, connection between the side and floor doors whereby the doors move simultaneously into and out of closed position, and a connection between the side door and operating shaft for operating said doors simultaneously.

12. In a car, a pivotally suspended side door, a pivotally suspended floor door, an operating shaft, and operative connection between the shaft and side door and between the side door and floor door whereby the floor door will be operated from the shaft through the medium of the side door.

13. In a car, a pivotally suspended side door and a pivotally suspended floor door arranged to engage the side door in closed position, an operating shaft, connection between the operating shaft and side door for moving the same out of engagement with the floor door, and independent connection between the side and floor doors whereby the floor door in downward movement lifts the side door out of engagement with itself.

14. In a car, a center sill, a floor door hinged at its edge to the sill, a side door pivotally suspended at its upper edge and at its lower edge supporting the outer edge of the floor door, an operating shaft, connection between the operating shaft and side door arranged to move the side door out of engagement with the floor door to release the latter, and connection between the floor door and side door whereby the floor door depressed by the weight of load will raise the side door to form with itself a laterally discharging chute.

15. In a car, a center sill, a floor door hinged at its edge to the sill, a side door pivotally suspended at its upper edge and at its lower edge supporting the outer edge of the floor door, an operating shaft, connection between the operating shaft and side door arranged to move the side door out of engagement with the floor door to release the latter, and connection between the floor door and side door whereby the floor door depressed by the weight of load will raise the side door sufficiently out of the path of laterally discharging load to eliminate downward load deflection by the side door.

16. In a car, a center sill, a floor door, hollow pivot members secured to the center sill, socket members revolubly mounted on said pivot members secured to the door, and an operating shaft revolubly mounted in the hollow pivot members whereby the center of door oscillation is coincident with the shaft axis.

17. In a car, body ends of box girder form, bearings mounted in the upper corners of said ends, body sides of plate girder form having longitudinal and transverse stiffening portions, and trunnions at the upper corners of said sides fixed to the longitudinal and transverse stiffening portions of the sides and revolubly engaged in said bearings.

In witness whereof, I have hereunto set my hand, in presence of two witnesses.

FRANK DITCHFIELD.

Witnesses:
S. R. W. ALLEN,
G. M. MORELAND.

Copies of this patent may be obtained for five cents each, by addressing the "Commissioner of Patents, Washington, D. C."